Sept. 4, 1951 M. P. LEPIE 2,566,735
DECORATION OF CERAMIC WARE
Filed June 21, 1949
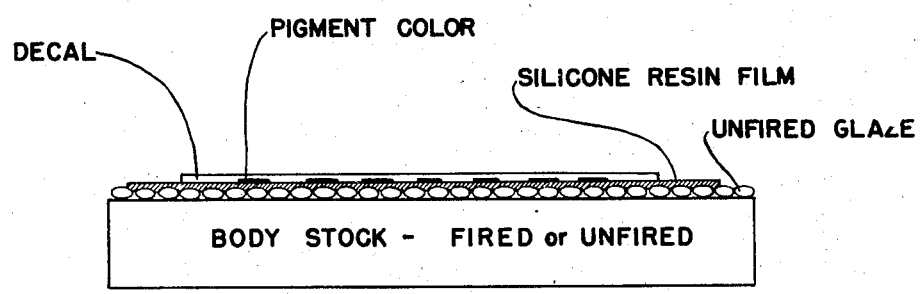
Fig.1. BEFORE FIRING
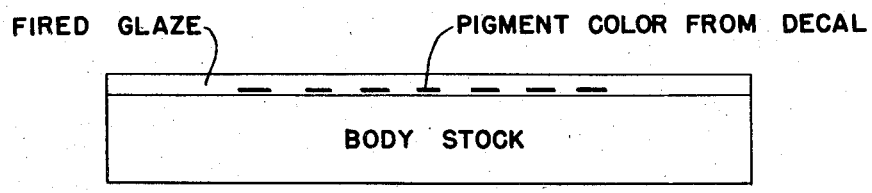
Fig.2. AFTER FIRING
INVENTOR
Myron P. Lepie
BY
Milton Zucker Patented Sept. 4, 1951

2,566,735

UNITED STATES PATENT OFFICE 2,566,735

DECORATION OF CERAMIC WARE

Myron P. Lepie, New Rochelle, N. Y.

Application June 21, 1949, Serial No. 100,524

4 Claims. (Cl. 154—99)

This invention is concerned with the decoration of ceramic ware, and aims to provide a method for the production of underglaze decorations from high fire decalcomania transfers (decals), which is characterized by simplicity and low cost. In essence, my new method is characterized by the bonding of the decal over the unfired glaze by a silicone resin, followed by firing, the transfer sinking into the glaze during the glost fire.

Ordinarily, ceramic ware is produced by firing the body stock, applying glaze and firing (glost fire), and finally applying a "low fire" decal which contains a substantial amount of flux, which bonds the color to the glaze. The decoration is, of course, a surface decoration, and hence is not as desirable as underglaze decoration; but the method avoids the decoration of glaze seconds, and permits the use of colors which would not withstand the high temperatures of the glost fire. Hence, almost all cheaper decorated ceramic ware is overglaze decorated.

In the production of underglaze ceramic ware by the use of transfers, the body ware is fired to the temperature suitable for its particular composition. A high-fire decal (one which will withstand the glost fire) is then applied; it may be either the conventional type, which is applied to the body ware, and then wet to strip off the paper backing, or the slide off type, which is slid off the backing onto the ware. After application, the varnish holding the color is burned off, at about 900° F. or higher. The piece is then glazed, and fired to the necessary temperature to sinter the glaze.

Attempts have been made to speed up this process and still get high quality decoration, protected by the glaze. In general, these methods involve firing the decal and the glaze together, using special adhesives which are designed not to give excessive gassing, so that the glaze is not too seriously disrupted in the process. The difficulty with all these processes is the high percentage of seconds obtained, due to the fact that the gases from the burning of the binder in the decal always produce some bubbling.

I have discovered how to obtain under glaze decal decorations of the highest quality on ceramic bodies (chinaware, earthenware or porcelain). In my method glaze is applied to the fired or unfired body stock, and the decal is applied over the unfired glaze, after first coating the glaze with a water resistant film, where the decal is to be applied, of a film forming silicone resin. The whole object is then fired; the organic binder in the decal burns off before the glaze softens, the silicone resin holding the color in place during the process; when the glaze softens, the color settles down toward the body stock; when the fired piece is withdrawn from the oven, it consists of decorated body stock, with the decoration embedded in the glaze and protected by it.

The accompanying drawing illustrates the invention as outlined above. Figure 1 showing the piece before firing, and Figure 2 showing the piece after firing.

Where an ordinary strip decal is used, I coat the glazed body stock with a silicone resin solution, which is absorbed into the body stock to form a water resistant film. The back of the decal is likewise coated with silicone resin coating and the coating allowed to tack up; this tacky coating is used to adhere the decal to the glaze while the paper backing is stripped off.

Where a slide off decal is used, the glazed body stock is coated with the silicone resin solution, which is absorbed by the unfired glaze. The slide off decal is then slid into the coated glaze.

With either type of decal, the piece is then run into an oven, where the organic binder of the decal is burnt off; the silicone resin holds the pigment until the glaze softens sufficiently to prevent dusting off—finally, the pigment settles down into the glaze, and becomes an underglaze decoration. Obviously, with the organic binder on top of the glaze, the gases developed in burning are largely gone before the decal sinks into the glaze.

As indicated above, the body stock may be fired alone, or the glaze and decal may be applied to the unfired body. The choice of method is largely a matter of economy—certain shapes and body stocks fire with a small percentage of malformation, others are extremely difficult to fire and maintain shape. Where the percentage of seconds is relatively small, the savings in firing cost will offset the loss of glaze and transfers on the pieces which are deformed in firing—with a large percentage of seconds, it is better to fire the body stock separately.

Any type of glaze may be used which is sufficiently adherent to take the resin solution. A typical example of such a glaze is the following:

Charge into a ball mill 18 pounds water
1 pound 9½ ounces titanium dioxide
3¼ pounds dextrin
14 ounces alumina hydrate
1½ pounds bentonite
25 pounds broken up frit
9¼ pounds flint
22¼ pounds ground feldspar Grind 6 hours, add > 22 pounds water
> 2 pounds Florida kaolin
> 11 pounds whitening
> 8¼ pounds white lead Grind 1½ hours more—discharge.

The glaze is applied to the body stock in conventional fashion.

Any silicone resin solution can be used for preparing the glaze surface for the decal, since all of the resin solutions on the market give the necessary water-resistant films—I have used the various silicone resin solutions available on the market with equal success. These are generally obtainable as solutions in aromatic hydrocarbons, and are reduced to application viscosity as required with toluol, xylol, or solvent naphtha. Chemically, the resins are mixed siloxane polymers, generally poly-phenyl methyl siloxane and/or poly-phenyl ethyl siloxane.

For causing adherence of the ordinary strip decal, it is necessary to coat the decal with a silicone resin solution which goes through a tacky stage during air drying. While almost all of the resins are tacky at some stage, I prefer for this purpose to use Dow-Corning DC802 silicone resin solution, since it retains its tack for a considerable period, thus making working easier.

The decals I use must be of the high-fire type, since they must withstand the glost fire. However, they can be prepared by any process, including stencil, silk screen, letterpress and intaglio printing, as well as the more conventional lithographic method—all of them, of course, are high-fire colors held in place by combustible binders.

My method makes possible, for the first time, the production of underglaze decorated ceramic ware with a single firing for the glaze and decal.

I claim:

1. The method of decorating ceramic ware which comprises applying glaze to a body stock, applying a film of silicone resin to a portion of the unfired glaze, applying a decorative transfer comprising coloring matter and a combustible binder to the film of silicone resin, and glost firing to burn the combustible binder and sinter the glaze, whereby the decorative color sinks into the glaze in the pattern present in the decorative transfer.

2. The method of producing decorated ceramic ware with a single fire, which comprises applying a glaze to an unfired body stock, applying a film of silicone resin to a portion of the unfired glaze, applying a decorative transfer comprising coloring matter and a combustible binder to the film of silicone resin, and firing to set the body stock, burn the combustible binder and sinter the glaze, whereby the decorative color sinks into the glaze in the pattern present in the decorative transfer.

3. The method of claim 1, in which the transfer is a slide-off decal.

4. The method of claim 1, in which the transfer is a strip decal, the method being further characterized by the application of a film of silicone resin to the back of the decal, and application of the decal to the piece while said film is in a tacky state.

MYRON P. LEPIE.

REFERENCES CITED

The following references are of record in the file of this patent:

UNITED STATES PATENTS

| Number | Name | Date |
|---|---|---|
| 2,324,433 | Scheetz | July 13, 1943 |
| 2,419,918 | Scheetz | Apr. 29, 1947 |
| 2,476,570 | Van Horn et al. | July 19, 1949 |